Jan. 11, 1927.
J. F. CULLEN
1,614,286
PNEUMATIC TIRE
Filed April 13, 1925
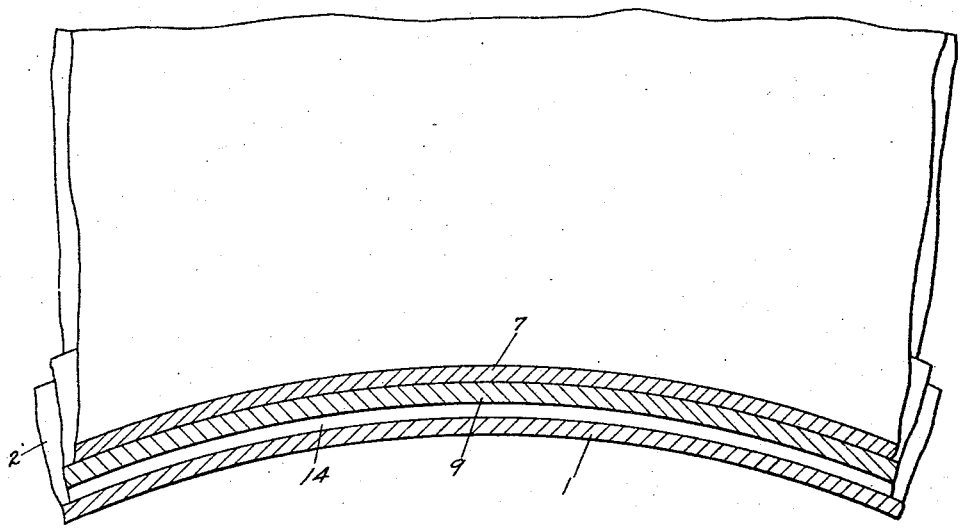
Fig. II
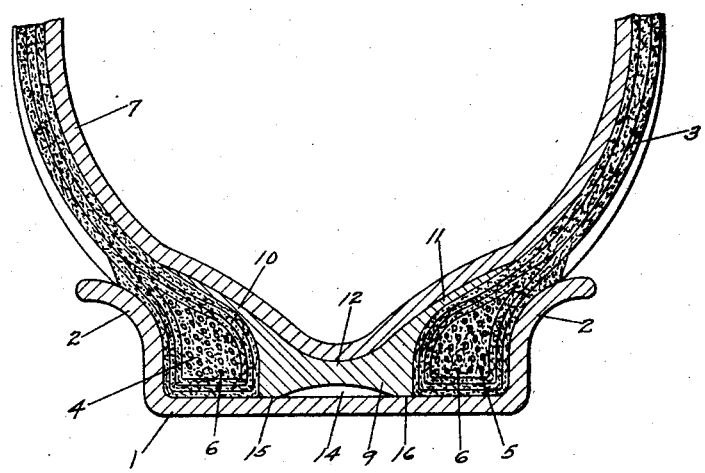
Fig. I
Inventor
Julian F. Cullen,
By Atkins & Atkins,
Attorneys.

Patented Jan. 11, 1927.

1,614,286

UNITED STATES PATENT OFFICE.

JULIEN F. CULLEN, OF PORTLAND, OREGON, ASSIGNOR TO COLUMBIA TIRE CORPORATION, A CORPORATION OF OREGON.

PNEUMATIC TIRE.

Application filed April 13, 1925. Serial No. 22,904.

My invention relates to pneumatic tires, of that class generally known as low pressure tires, or more specifically "balloon tires."

In tires of the description named, the air-bag, which, through its inflation, gives shape and resiliency to the tire, is filled with air at a lower pressure than are the air-bags used in that type of tires which may be designated as "high pressure tires."

A difficulty has been experienced in filling the space between the opposite sides of the tire proper or the shoe so as to firmly confine them in the tire rim. In consequence of that difficulty there has been found in practice a tendency of said opposite sides of the shoe or tire beads as they are called to rock or work in the rim. The result has been either to dislocate the strip of resilient or yielding material which has been heretofore used to protect the air-bag in that portion of it entering or tending to enter the space between the tire beads, or to admit of a bulge of the air-bag into said space. The result has been to damage the air-bag even to the extent of rupturing it.

By my invention provision is made of a filler contrived and adapted to completely fill the space defined on two sides by the tire beads and on the other sides by the wall of the air-bag and the intermediate portion of the rim-tread over which the tire beads do not extend. I provide also an arched or bridge-like construction of the web of the filler by which any sudden pressure, exerted for example by the striking of the tire against an obstruction in service, is utilized to effect a positive expansion, under compression, of the body of the filler, against the opposing faces of the tire beads, with the effect, without diminution of the resilient efficiency of the tire, of driving the tire beads into close engagement with the walls of the angle defined by side walls of the rim.

What constitutes my invention will be hereinafter specified in detail and succinctly defined in the appended claims.

In the accompanying drawing,

Figure I is a transverse section of a tire of the class to which my invention is applicable, and of the tire rim upon which the tire is mounted, the tread portion of the entire tire being broken away.

Figure II is a vertical section of a portion taken of a tire at right angles to the subject matter of Figure I.

Referring to the numerals on the drawing, 1 indicates the rim-tread of a metallic tire that is provided with side walls 2 of any usual or suitable and preferred description. 3 indicates the outer tire covering or shoe which may be made of any ordinary or suitable flexible material, the same being usually made in part of fabric and in part of rubber. The shoe is provided upon its opposite sides with tire beads 4 and 5, which are made to fit, respectively, into the angular spaces defined by the side walls 2 at opposite sides of the rim-tread. The tire beads may be made according to any usual or suitable and preferred method of construction, and preferably include within each bead a bundle of reinforcing annularly disposed wires 6. 7 indicates an inflatable air tube or air-bag, which in practice occupies the interior of the shoe 3 whereby through its inflation it imparts to the shoe the shape and the degree of resiliency desired.

The elements above specified represent those of the usual kind employed in tires of the kind indicated and in usual method of assemblage. To the extent already described the tire beads 4 and 5 are separated by an open space into which the inflation of the tube 7 tends, along that line, to drive the wall of said tube. The means ordinarily provided for limiting the protrusion of the wall of the tube 7 into that space consists usually of a mere annular strip of stiff flexible material, such for example as that of which the shoe 3 is made. It has been found, as has been heretofore specified in general terms, that the employment of such a strip of material affords an inadequate protection to the tube 7, and exposes the beads 4 and 5 to a tendency in service to rock or tilt upon the tire rim.

To overcome such objectionable tilting of the beads 4 and 5, and also to protect the tube 7 from injury, is the object which my invention is designed and adapted to accomplish. To that end I provide an annular member 9 which I designate by the term "filler" because it completely fills the space between the opposing faces of the beads 4 and 5. It is provided on its opposite sides with outwardly tapered flanges 10 and 11 designed and adapted to fill the spaces between the beads and the tube 7, and to afford a close fitting support for the wall of the tube where it extends above said beads.

The filler 9 may be of any suitable material preferably such as that of which the shoe 3 is made, and the flanges 10 and 11 are preferably made integrally with the filler and of the same material. The filler including its flanges 10 and 11 might be made of rubber, if for any reason it were desirable to use rubber alone.

The top of the filler 9 is slightly dished or inversely arched as indicated at 12, for the purpose, mainly, of directing the pressure of the tube 7 where the members 7 and 9 come into contact. Below the reverse arch 12, I provide a low bridge or arch 14 which spans a portion of the rim-tread 1 and defines, upon opposite sides of the filler 9, toe-pieces 15 and 16 which engage the opposite faces of the beads 4 and 5, respectively.

In operation, the effect of the member 9, by reason of its shape and disposition, is to limit the expansion of the tube 7, and to hold the beads 4 and 5 flat against the face of the rim-tread 1 with which they contact. Moreover, the presence of the arch or bridge 14 permits the intermediate body of the filler 9 to yield or undergo compression towards that portion of the face of the rim-tread which said arch spans, with the effect of exerting a positive pressure against the opposite beads 4 and 5 to force and hold them immovably in place in the angular spaces provided for them by union of the side walls 2 and the rim-tread 1. By this means provision is made whereby any sudden compression of the tire in service at any point, such as would occur if the tire should meet an obstruction in the road upon which it is traveling, will have the effect of preventing that rocking or tilting movement of the beads which would, in the absence of the member 9, occur.

What I claim is:

1. In a pneumatic tire, the combination with a rim, a shoe provided upon opposite sides with tire beads fitting the rim, and an air tube within the shoe, of a filler for the space defined between the respective beads, the air tube, and the rim-tread; substantially for the purpose specified, said filler being provided on the outside with an inwardly curved arch and on the side next to the rim-tread with an opposing arch adapted to render the filler operatively compressible for the purpose specified.

2. A filler for the space defined between the beads of a tire shoe, said filler having a weakened portion and means for localizing tube pressure upon said weakened portion.

3. A filler for the space defined between the beads of a tire shoe, said filler having its inner and outer surfaces provided with recesses.

In testimony whereof, I have hereunto set my hand.

JULIEN F. CULLEN.